United States Patent [19]

Ziemba

[11] 4,100,856

[45] Jul. 18, 1978

[54] FUZE ENCODER

[75] Inventor: Richard Thomas Ziemba, Burlington, Vt.

[73] Assignee: General Electric Company, Burlington, Vt.

[21] Appl. No.: 769,757

[22] Filed: Feb. 17, 1977

[51] Int. Cl.$^2$ ............... F42C 19/06; G06K 7/04; H01R 9/00
[52] U.S. Cl. .................. 102/206; 29/630 R; 235/441
[58] Field of Search ............... 102/70.2 R; 235/61.11 R, 61.11 A, 61.11 C; 29/628, 630 R, 630 B

[56] References Cited

U.S. PATENT DOCUMENTS

| | | | |
|---|---|---|---|
| 2,732,614 | 1/1956 | Shower | 29/630 R |
| 3,105,895 | 10/1963 | Lyon | 235/61.11 A |
| 3,152,247 | 10/1964 | Brown | 235/61.11 A |
| 3,396,461 | 8/1968 | Spooner et al. | 29/630 B |
| 3,500,021 | 3/1970 | Jones et al. | 235/61.11 A |
| 3,844,217 | 10/1974 | Ziemba | 102/70.2 R |
| 3,930,308 | 1/1976 | Munro | 29/630 B |

Primary Examiner—Charles T. Jordan
Attorney, Agent, or Firm—Bailin L. Kuch

[57] ABSTRACT

A method of manufacture of a tape reader utilizing spring contacts particularly adapted to ordnance use, wherein the spring contacts are closely and accurately spaced apart and comprise a reliable assembly of very few parts.

10 Claims, 3 Drawing Figures

FUZE ENCODER

BACKGROUND OF THE INVENTION

1. Field of Art

This invention relates to a mechanical to electrical encoder, and more particularly, to a system for generating a coded electrical output signal which is uniquely responsive to the disposition of a matrix of conductors. This invention is particularly adapted for use in an electronic fuze for ordnance.

2. Prior Art

Mechanical to electrical encoders broadly are well known, and an early example thereof is a punched tape reader such as is used in a telegraph system. Such encoders are also known for use in electronic fuzes for ordnance. For example, a system having a tape with visable arabic numbers on one side, and code-combination electrical conductors on the other side which are read by a bank of electrical contacts is shown in my patent U.S. Pat. No. 3,844,217 filed Sept. 28, 1972. Various encoders are shown in Technical Report 4624, "Beehive Electronic Time Fuze" by Picatinny Arsenal, Dover, N.J., April 1974, such as an odometer encoder, a disc encoder, and a tape encoder. Other encoders, utilizing spring type contacts, are shown by L. R. Lyon in U.S. Pat. No. 3,105,895, filed Jan. 27, 1960; J. K. Brown in U.S. Pat. No. 3,152,247 filed Sept. 20, 1961; and S. R. Jones et al in U.S. Pat. No. 3,500,021 filed July 27, 1966.

SUMMARY OF THE INVENTION

An object of this invention is to provide a method of manufacture of a reader utilizing spring contacts particularly adapted to ordnance use, wherein the spring contacts are closely and accurately spaced apart and comprise a reliable assembly of very few parts.

A feature of this invention is method of manufacturing a contact assembly including fixing each of the turns of a helical spring to respective conductive lands on a support and then cutting each of the turns to respectively form a substantially C-shaped contact element.

BRIEF DESCRIPTION OF THE DRAWING

These and other objects, features and advantages of the invention will be apparent from the following specification thereof taken in conjunction with the accompanying drawing in which.

DESCRIPTION OF THE INVENTION

Figure 1:
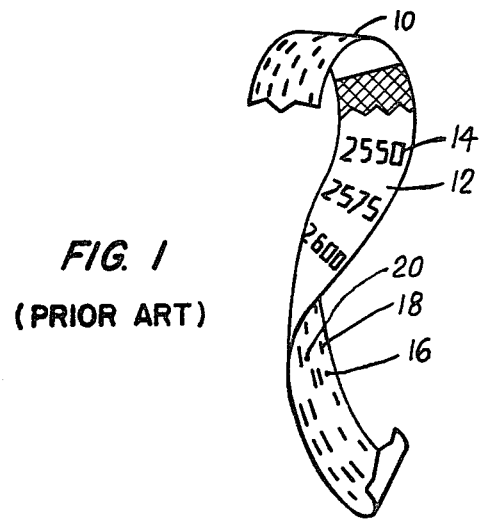
FIG. 1 is a showing of a conventional tape which is read by a reader.

The conventional tape 10 is shown in FIG. 1. On one side 12 it has a column of rows of visible indicia 14 such as arabic numbers. On the other side 16 it has a column of rows of conductive areas 18 and nonconductive areas 20. The conductive areas 18 are each electrically connected to a main conductor or layer in the tape. Each row of areas on side 16 has a topographical relationship to a row of indicia on the side 12. In the exemplary tape shown, there are twelve areas, conductive and nonconductive, in each row.

Figure 2:
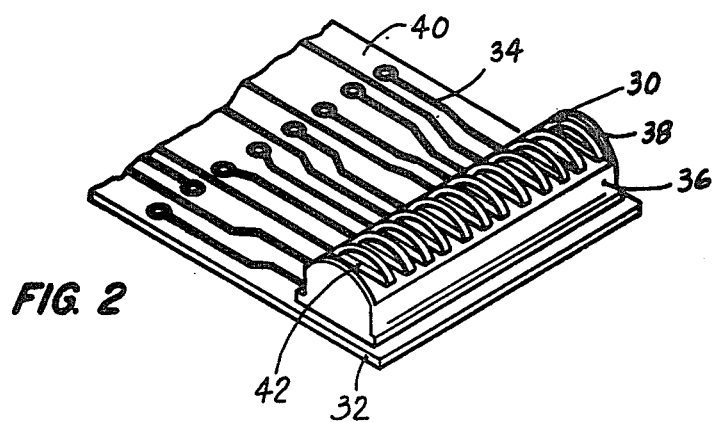
FIG. 2 is a perspective view of a tape reader embodying this invention.

The tape reader is shown in FIG. 2. It comprises a plurality of reader springs 30, a circuit board or tape 32 having a like plurality of conductors 34, and a spring alignment block 36 having an upper face 38, over which the side 16 of the tape passes, a lower face in abutment with and fixed to the upper face 40 of the circuit board, and a like plurality of transverse slots 42 extending from the upper face to the lower face.

Figure 3:
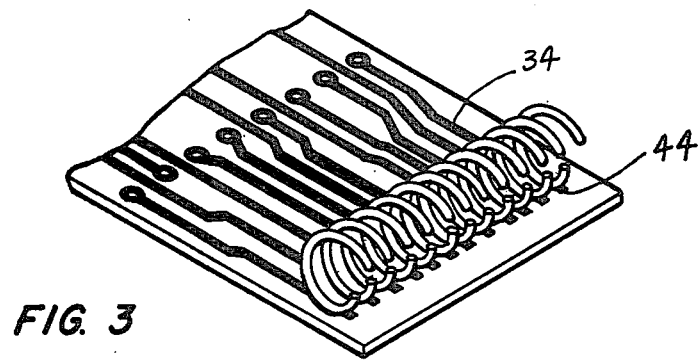
FIG. 3 is a perspective view of the reader of FIG. 2 with the spring alignment block removed.

In manufacture, and as depicted in FIG. 3, a land 44 is exposed on each conductor 34, here shown at the end portion of each conductor. A helical coil spring having a like plurality of turns is disposed on the lands, and a portion of each turn which is adjacent the land is mechanically and electrically fixed to a respective land, as for example by induction soldering. The exemplary spring is fabricated in twelve turns from beryllium copper and plated with a nobel metal to prevent oxidation of its surface. After each turn of the entire coil is fixed to its respective land, a longitudinal cut is made through the coil, severing each turn once, just above its connection to the respective land. The cut may be made by a high-speed, abrasive cut-off wheel. The helical spring is thus transformed into a plurality, e.g. 12, insulated and free-standing contact springs. The spring alignment block 36 is then placed onto the springs, with each contact spring entering a respective slot 42, and fixed, e.g. bonded, to the circuit board. The contact springs, the slots, and the conductive areas 18 on the tape respectively should be in alignment. This block serves as a housing and guide to assure that the contact springs do not become misaligned from the conductive areas. Misalignment might otherwise occur during the high-g setback load developed at the instant of projectile firing, which projectile would include a fuze having the disclosed tape and tape reader. The contact springs, when free, resiliently protrude slightly above the upper face 38 of the block, and the tape is maintained in tension against the upper face of the block, to provide positive tension of the springs against the conductive areas of the tape.

What is claimed is:

1. A method of manufacture of a contact assembly having a plurality of contact springs comprising:
   providing a support having a like plurality of spaced apart conductive lands;
   providing a helical spring having a like plurality of turns;
   disposing each of said turns adjacent a respective one of said lands;
   mechanically and electrically fixing a portion of each of said turns to the respective adjacent land; and
   cutting each turn.

2. A method according to claim 1 wherein:
said lands are uniformly spaced apart in a row.

3. A method according to claim 2 wherein:
said turns are uniformly spaced apart.

4. A method according to claim 1 wherein:
a longitudinal cut is made through one side of said helical spring to sever each turn in sequence.

5. A method according to claim 4 wherein:
said longitudinal cut is made adjacent the portion of each of said turn which is fixed to said land.

6. A method according to claim 1 wherein:
a guide having a like plurality of slots is disposed over said plurality of turns, each turn entering into and extending beyond a respective slot, and said guide is fixed to said support.

7. A contact assembly having a plurality of contact springs made according to the process of:

providing a support having a like plurality of spaced apart conductive lands;

providing a helical spring having a like plurality of turns;

disposing each of said turns adjacent a respective one of said lands;

mechanically and electrically fixing a portion of each of said turns to the respective adjacent land; and cutting each turn to form a respective one of said plurality of contact springs.

8. A contact assembly according to claim 7 further including:

a guide having a like plurality of slots disposed over said plurality of turns, each turn disposed in and extending beyond its respective slot, said guide being fixed to said support.

9. A contact assembly comprising:

a support having a plurality of spaced apart conductive lands; and a like plurality of turns of a helical spring, each turn cut and spaced from its adjacent turn and disposed adjacent to and mechanically and electrically fixed to a respective one of said plurality of lands, each turn forming a substantially C-shaped spring.

10. A contact assembly according to claim 9 further including:

a guide having a like plurality of slots disposed over said plurality of turns, each turn disposed in and extending beyond its respective slot, said guide being fixed to said support.

* * * * *